Nov. 28, 1961     C. A. CAZAUVIEILH     3,010,221
SPEED DATA COMPUTER FOR AIRCRAFT FLIGHT SIMULATORS
Filed July 8, 1958     3 Sheets-Sheet 1

INVENTOR.
CHRISTIAN ANDRÉ CAZAUVIEILH

INVENTOR.
CHRISTIAN ANDRÉ CAZAUVIEILH

United States Patent Office 3,010,221
Patented Nov. 28, 1961

3,010,221
SPEED DATA COMPUTER FOR AIRCRAFT FLIGHT SIMULATORS
Christian André Cazauvieilh, Courbevoie, France, assignor to Societe d'Electroniques et d'Automatisme, Courbevoie, France
Filed July 8, 1958, Ser. No. 747,306
Claims priority, application France July 11, 1957
16 Claims. (Cl. 35—12)

The present invention relates to improvements in or relating to aircraft flight simulators for the ground training of crews by the simulation of complete fictitious flight, and more specifically, to computing and delivering analog voltages representing the evolutions with respect to time of aircraft speed and its components along the three fixed reference axes of a coordinate system.

These improvements are mainly concerned with those periods of simulated flights during which the aircraft is supposed to depart from ground and to approach ground and land. During such periods in a simulated flight, the speed data are computed by means of a conventional analog computer solving a fixed and predetermined relation depending upon its circuit diagram. However, this relation is not satisfied for ground departure and approach periods at which the aircraft is still on the ground or at altitudes lower than certain values. For a complete simulation of a flight therefore, further means must be provided in addition to a conventional analog computer.

It is therefore, one of the objects of the invention to provide such further means and more particularly, a speed data computer for aircraft flight simulators, experimental program units providing predetermined changes in magnitude of the speed and the speed components along three fixed coordinate axes during such ground departure and approach periods, the outputs of such program units being selectively substituted for the outputs of normal flight speed data computers, and connected to the respective inputs of as many servo-mechanisms as required to produce such speed data on their respective outputs whereby such substitution and connection is controlled by an automatic switch from a monitoring unit.

These and other objects of the invention will be more fully explained with reference to the accompanying drawings, wherein.

Figure 2:
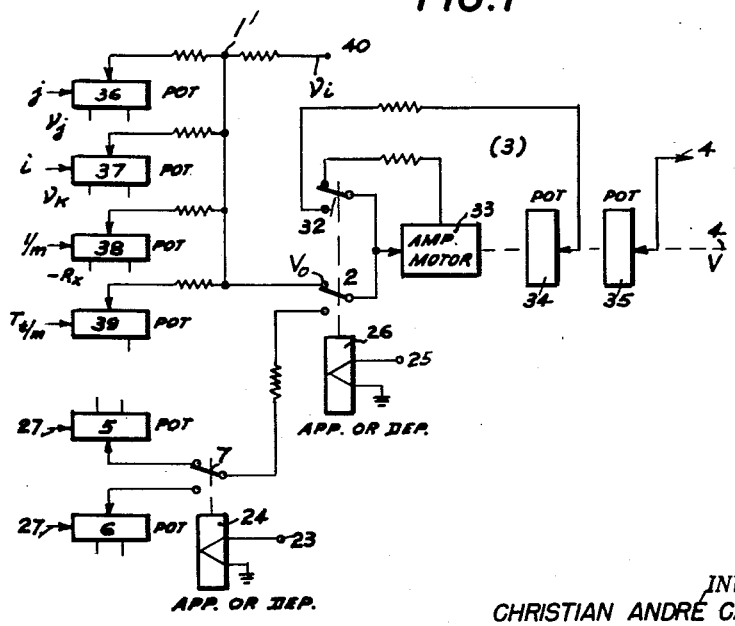
FIG. 2 shows a computer for the speed data V, which is the value of the simulated speed of the aircraft concerned.
Figure 3:
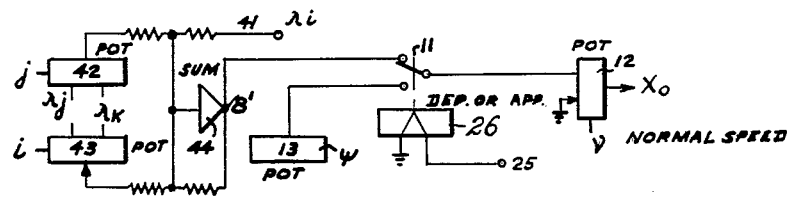
Figure 4:
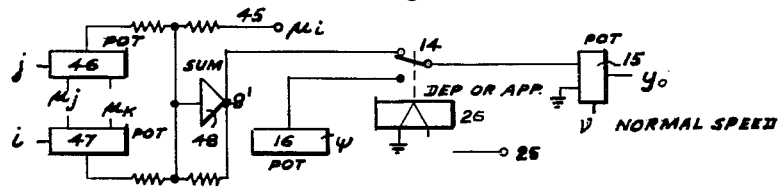
Figure 5:
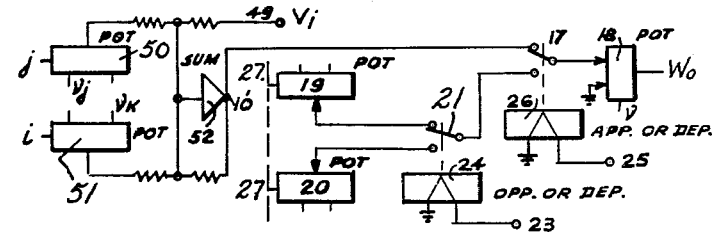
Figure 6:
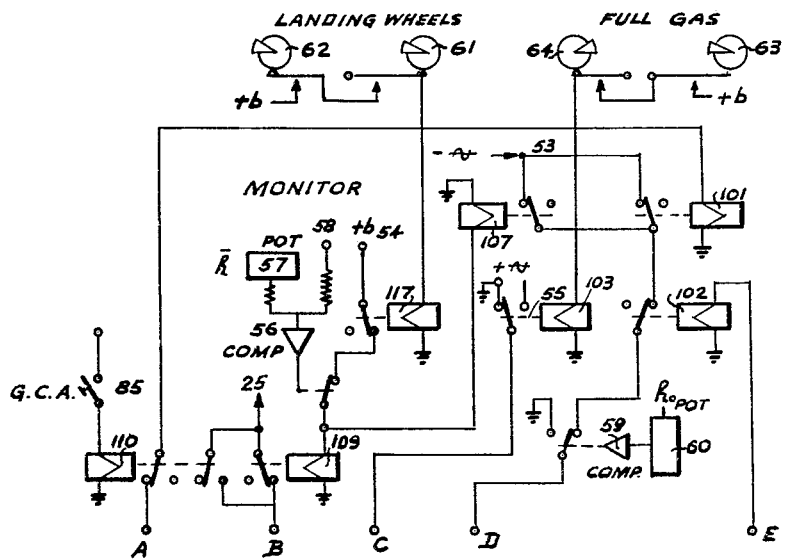
Figure 7:
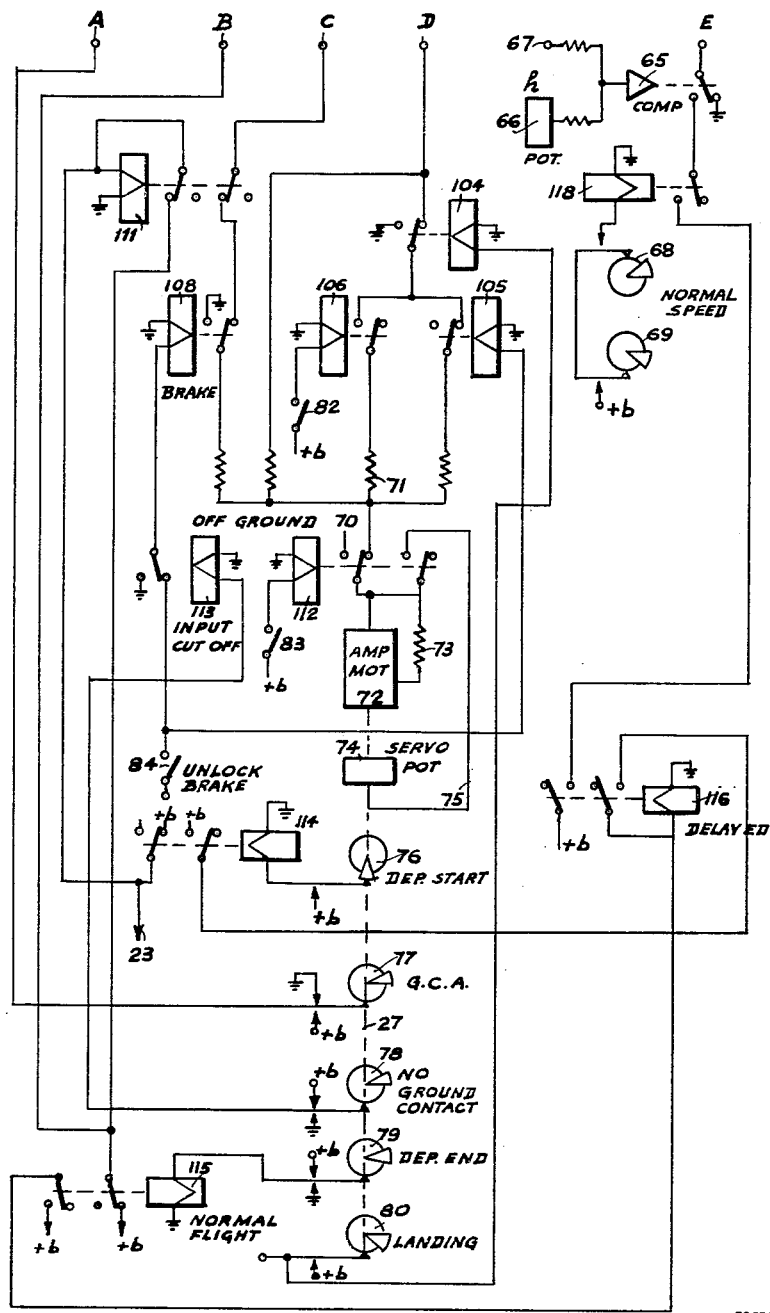

FIGS. 3, 4, and 5 respectively illustrate the computation of the three components of V, namely, $x^0$, $y^0$, and $h^0$ along the three axes of a fixed reference system of Carthesian coordinates; and, FIGS. 6 and 7 represent the monitoring circuit controlling the computer arrangements of FIGS. 2 to 5; FIG. 6 and FIG. 7, being arranged below FIG. 6, are interconnected by terminals of identical markings.

Figure 1:
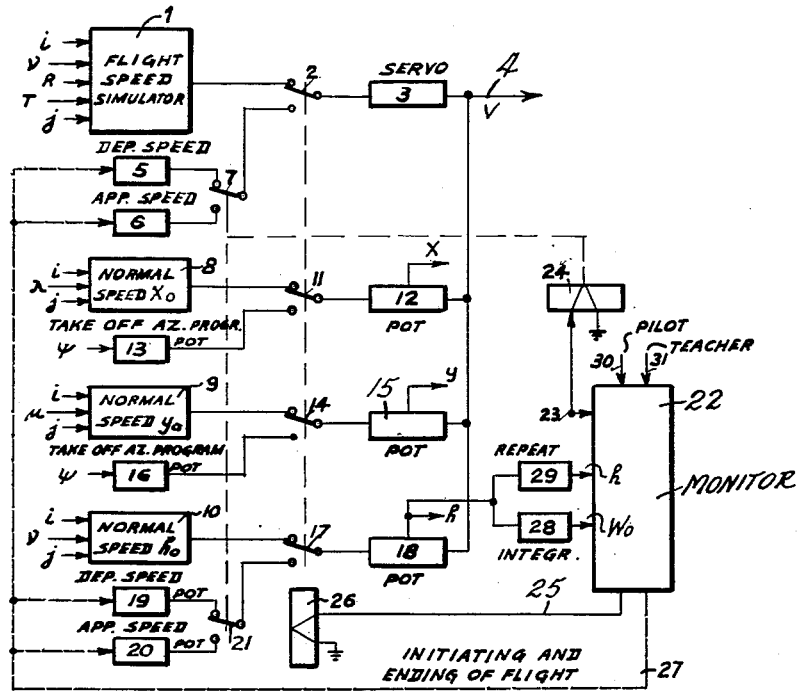
FIG. 1 shows the overall arrangement of a device according to the invention.

FIG. 1 is a block diagram of that part of a flight simulator defined as a speed data computer and forming part of this invention. In accordance with the invention, it includes the conventional speed data computer 1 which is known per se and therefore, not described in detail. The input data and parameters for such a conventional computer, however, are designated as $i$, $j$, V, R, and T, and will be defined further below. The output of computer 1 is fed to one terminal of a change-over switch 2 having an armature controlled by relay 26 and connected to one input of a servo-mechanism 3 delivering at its terminal 4 the analog representation of speed V of the simulated aircraft during and throughout a fictitious flight.

Unit 3 of FIG. 1 is detailed in FIG. 2 at (3).

According to the invention, two program units 5 and 6 for the simulation of speed V during ground departure and approach periods, respectively, have outputs connected respectively to the outputs of a change-over switch 7 having an armature connected to a terminal of change-over switch 2 not connected with the output of conventional computer 1.

Three computers 8, 9 and 10 serve to compute the three speed components of the speed during normal periods of simulated flights. Computer 8 receives input parameters $i$, $j$, and $\lambda$, computer 9 receives $i$, $j$ and $\mu$, and computer 10 receives $i$, $j$, and $\gamma$. The corresponding input parameters for computer 1 will be defined further below.

The output of computer 8 is connected to one terminal of change-over switch 11 having an armature connected to an input of a potentiometer or equivalent function transducer 12 controlled from output 4 of servo-mechanism 3. Transducer 12 issues the analog representation of speed component $x$. Program unit 13 associated with computer 8 has an output connected to the other terminal of switch 11. The program of 13 is the same for ground departure and approach periods of simulated flight.

The output of computer 9 is connected to one terminal of a change-over switch 14 having an armature connected to a potentiometer or equivalent function transducer 15 controlled from the output 4 of servo-mechanism 3 and delivering the analog representation of speed component $y$. A program unit 16 associated with computer 9 has an output connected to the other terminal of switch 14. The program recorded on 16 is the same for ground departure and approach periods of simulated flight.

The output of computer 10 is connected to one terminal of a switch 17 the armature of which is connected to the input of a potentiometer or equivalent function transducer 18 delivering the third component of the speed $h$. Computer 10 has associated therewith two program units 19 and 20, for simulating the variation of speed during departure and approach periods, respectively.

An intermediate switch 21 serves to connect, as the case may be, either one or the other of outputs of program units 19 and 20 to the other terminal of switch 17.

The decision for simulating either a ground departure or a ground approach period is made within monitoring apparatus 22. Output 23 of monitor 22 issues when required a voltage controlling a relay 24 determining such decision or choice. Switches 7 and 21, for instance, may be in the form of two change-over contacts of relay 24. When in high position, for example (as shown in the drawings), the armatures of 7 and 21 are placed to simulate a ground departure period. Monitor 22 will also control the change-over from conventionally computed data to program issued data by the actuating of a relay 26 through output 25. Contacts 2, 11, 14 and 17 may form change-over contacts of relay 26 and, in the rest condition shown, the computed data are applied to transducers 3, 12, 15, and 18. Program units 5, 6, and 19, 20 may preferably be actuated as shown by output 27 of equipment 22 and may comprise recording potentiometers or equivalent function transducers. Program units 13 and 16 are merely adjustable from an input $\psi$ to vary their initial positions.

It is to be understood that one of the coordinates is related to the altitude, namely, the $h_0$ component of the speed. Thus, depending upon the type of simulated operation, take-off or landing, the program in 5 and 6, and in 19 and 20 must be different. On the other hand, the two other components $x_0$ and $y_0$ are not related to such a parameter. In order to define, therefore, the actual operation of program units such as 13 and 16, it will suffice to impress a parameter $\psi$, as an initial condition. This parameter will be the azimuth of the take-off or landing area. Output 25 of monitor 22 merely defines the time interval of such ground departure or ground approach operation.

In addition to various controls explained further below, it is useful to introduce into monitor 22 both parameters $h$ and $h°$ (derived from $h$ by an integration process) i.e., vertical speed component and altitude of craft. Consequently, as shown in FIG. 1, the output of transducer 18 is applied on a repeater mechanism 29 and an integrating mechanism 28 to introduce $h°$ for $h$ into monitor 22.

The block diagram of FIG. 1 does not take into account the terminology used further below in defining the type and technology of its components. The pilot's controls are merely indicated as applied at one input 30. Other automatic controls such as shown at 31, are actually impressed by the teacher. Such controls are only shown by way of illustration and will be described in detail further below. The overall operation of such an arrangement is readily understood.

During any part of a simulated flight except ground departure and ground approach, switches or contacts 2, 11, 14 and 17 are in their upper position. Monitoring equipment 22 is not active and the values of V, $x_o$, $y_o$, $h_o$ are delivered under control of "normal" computers 1, 8, 9, and 10. When the flight is initiated, monitor 22 is activated to change over the switches or contacts 2, 11, 14, and 17. As a result, program units 5 and 19 are connected to the lower terminals of switches 2 and 17. Once, however, this period in the simulated flight is terminated, contacts 2, 11, 14 and 17 are brought back to their upper position and computers 1, 8, 9 and 10 will again operate. At the end of the flight, for ground approach and landing, these contacts are again set back to their lower position, and so are contacts 7 and 21. In both initial and ending periods of a simulated flight, control 27 is activated.

There is no interruption or discontinuity in the values of the speed and speed components because on the one hand, the programs are appropriately designed and, on the other hand, the normal computers are continuously in operation although their outputs may not always be operative. There is therefore, no discontinuity in operation in changing over the simulator from one type of operation to the other.

Parameters $\lambda$, $\mu$, and $\gamma$ are cosines of the directions of the axes of the aircraft with respect to the fixed reference axes; let $R_x$ be the value of the component of the aerodynamical resistance of the aircraft along the axis of speed V for a craft concerned; $T_t$ the value of motor thrust of the craft; $m$ the mass of the craft; parameters $i$ and $j$, respectively, incidence and slide angle for the craft; the parameter $\psi$, as stated above, the azimuth angle of the take-off or landing field track; all these data are available in a normal flight simulator.

Referring to FIG. 2, the "normal" computer is shown as a summation circuit 1' of a number of analog voltages so that the voltage output at 1' is given by the relation:

(i) $V_o = a.\gamma_i + b.j.\gamma_j + c.i.\gamma_k - d.R_x/m + e.T_t/m$ wherein $a$, $b$, $c$, $d$ and $e$ are proportionality coefficients and at least $d$ and $e$ may be freely chosen by the designer: $\gamma_i$, $\gamma_j$, and $\gamma_k$ are the components of the direction cosines along the three axes; the other parameters have been previously defined.

The component voltages are applied as follows:

$a.\gamma$ from a terminal 40, being available in the simulator;

$b.j.\gamma_j$ from the slider of a potentiometer 36 driven by parameter $j$ and fed with an analog voltage $\gamma_j$ available in the simulator;

$c.i.\gamma_k$ from the slider of a potentiometer 37 driven by parameter $i$ and supplied with an analog voltage $\gamma_k$, also available in the simulator;

$-d.R_x/m$ from the slider of a potentiometer 38 driven by parameter $l/m$ and supplied with analog voltage $-R_x$, available in the simulator;

$e.T_t/m$ from the slider of a potentiometer 39 fed by a reference voltage and driven by the parameter $T_t/m$ available in the simulator.

The voltage $V_o$ is applied through the upper terminal of a contact 2 to the input of servo-mechanism (3). The armature of contact 2 is actuated by a relay 26 which is energized by lead 25. Simultaneously with contact 2, a further change-over contact 32 is actuated. Contact 32 in its upper position, closes an electrical tachometer feedback loop from amplifier/motor unit 33. In the condition shown, therefore, computer (1) operates in normal flight simulating periods and the motor shaft 4 in unit 33 represents by its position the speed V of the simulated aircraft. An electrical measure of this speed is further obtained from the slider of a potentiometer 35 driven by shaft 4.

For an "abnormal" period, a ground departure or ground approach period in the simulated flight, relay 26 is operated and a feedback loop of the servo-mechanism is then passed through a potentiometer 34 driven by shaft 4. In this case servo-mechanism (3) acts as a mere position repeater for its input voltage because this input voltage is then derived through the lower terminal of contact 2 from a record of V; as stated above, such a record has been made previously on a potentiometer 5 for the evolution of V with respect to time during a period of ground departure simulation, or as the case may be, on potentiometer 6 during a period of ground approach simulation. This analog V-voltage is derived from the potentiometer concerned depending on whether change-over contact 7 of relay 24 is its upper or lower position.

Relays 26 and 24 of course shown in any one of FIG. 2 to 5 and 2 and 5, respectively, are substantially the same relays as shown in FIG. 1; the duplication merely serves to clarify representation of these figures.

Potentiometers 5 and 6 may be made in otherwise well known manner to represent by their modes of winding an arbitrary but predetermined law. The same applies to any other function representative potentiometer disclosed.

FIG. 3 relates to speed component $x_o$. The arrangement comprises first a summing circuit for two analog voltages derived from potentiometers 42 and 43, and for an analog voltage derived from terminal 41. The summation is made through a conventional summing amplifier 44. Its output terminal is marked 8' to correspond with FIG. 1 wherein 8 denotes the "normal" $x_o$ computer. When contact 11 is in its upper position (as controlled by relay 26), its upper terminal feeds, the composite analog voltage to a potentiometer 12 the slider of which is driven by V and delivers the said "normal" speed component $x_o$ according to the relation:

(ii) $x_o = V.(\lambda_i + j.\lambda_j + i.\lambda_k)$ with certain proportionality factors applied thereto.

The component voltages are obtained as follows:

$\lambda_i$ from input terminal 41, being available in the simulator equipment;

$j.\lambda_j$ from the slider of a potentiometer 42 supplied with analog voltage $\lambda_j$ and driven by parameter $j$;

$i.\lambda_k$ from the slider of a potentiometer 43 driven by parameter $i$ and supplied with the available analog voltage $\lambda_k$;

$\lambda_i$, $\lambda_j$, $\lambda_k$, being the three components of the direction cosine director $\lambda$ along the three axes.

When contact 11 is in its lower position actuated by relay 26 under control of the monitoring equipment 22, the summation voltage at 8' is replaced by the output voltage of a potentiometer 13 which has recorded thereon the ground departure and approach program. The adjustment $\psi$ consists of a rotation permitted for the winding of potentiometer 13. The law recorded on 13 is a cosine law of $\psi$.

The $y_o$ speed component generator of FIG. 4 is obviously of a design identical with that of the $x_o$ speed component generator of FIG. 3. The analog $y_o$ at the slider of potentiometer 15 driven by speed V is given, for a "normal" flight period by the relation (iii) $y_o = V \cdot (\mu_i + j \cdot \mu_j + i \cdot \mu_k)$ with certain proportionality coefficients as stated for the other relations. This occurs during time intervals in which contact 14 is in its upper position and the upper terminal of contact 14 is fed from the output 9' of a summing amplifier 48 for the three following analog component voltages:

$\mu_i$ from input terminal 45.

$j \cdot \mu_j$ from the slider of a potentiometer 46 driven by parameter $j$ and receiving an analog voltage $\mu_k$;

$i \cdot \mu_k$, from the slider of a potentiometer 47 driven by parameter $i$ and receiving the analog voltage $\mu_k$;

$\mu_i$, $\mu_j$ and $\mu_k$ being available in the simulator.

When contact 14 comes in its lower position representing "abnormal" flight conditions as specified, the input to potentiometer 15 is the output of a potentiometer 16 displaying a program which is a sine law of $\psi$.

The $h_o$ speed component generator is shown in FIG. 5. The "normal" flight analog voltage is derived from the summation in summing amplifier 52 of the three following component analog voltages.

a voltage from input terminal 49, $\gamma_i$, a voltage from the slider of a potentiometer 50 driven by parameter $j$ and receiving an analog voltage $\gamma_j$, a voltage from the slider of a potentiometer 51 driven by parameter $i$ and receiving the analog voltage $\gamma_k$;

$\gamma_i$, $\gamma_j$, $\gamma_k$, being available in the simulator.

When contact 17 is in its upper position, the composite summation voltage at 10' is applied to a potentiometer 18 driven by the speed value V; consequently, $h_o$ is given by the relation:

(4) $h_o = V \cdot (\gamma_i + j \cdot \gamma_j + i \cdot \gamma_k)$ with proportionality factors included therein as started for the other relations.

When contact 17 is in its lower position representing "abnormal" flight conditions, potentiometer 18 receives the analog program voltage from either potentiometer 19 or potentiometer 20 as the case may be, and depending upon the position of contact 21 of relay 24 (controlled from monitoring equipment 22 as stated and shown with respect to FIG. 1). These potentiometers are driven from the monitoring equipment in a manner which will be explained further below. They display or record a sine law of such a drive under control of shaft 27.

FIGS. 6 and 7 show the monitoring equipment and are considered to be connected through leads A, B, C, D and E.

In this monitoring equipment, part 27 is a shaft driven by a servo-mechanism comprising the conventional amplifier-motor unit 72 with the usual feedback shown at 73. A further positional feedback loop extends through potentiometer 74 and lead 75 when this lead is closed by the contact of a relay 112 activated by the closure of an interrupter switch 83; in this way, the resetting voltage of that further loop is applied at 70. Such a reset is placed under the manual control of the "teacher" in the simulator equipment. Actuation of relay 112 cuts off the normal input of the servo-mechanism, such input being that through which the student pilot applies signals, corresponding to control actions, to the simulator equipment.

Shaft 27 is provided with the five following cams:

Cam 76 marks the beginning of a course and, during a first time interval, it maintains relay 114 in its energized condition (the "course" relates to the servo-mechanism proper);

Cam 79 marks the end of such a course of the servo-mechanism de-energizing relay 115 which was at work until this time instant;

Cam 78 marks the time instant of simulated rupture of contact with ground. This is achieved by opening a contact in the energizing circuit of relay 113, previously set to work.

Cam 80 marks the landings in the simulated flight by actuating to work relay 104;

Cam 77 concerns a special case of guided landing usually known as G.C.A. (Ground Control Approach). In this case, the aircraft is entirely guided by the ground station. A G.C.A. landing condition may be set by the teacher for instruction of the student pilot by actuating an interrupter 85 producing the activation to work of relay 110; cam 77 then acts during this type of approach to energize relay 101 through the work contact of relay 110.

All these informations deal only with the main effect of each cam. Secondary effects will be detailed further below.

In the monitoring equipment, the following three members are responsive to simulated altitude conditions.

A member or unit 56 serves to compare a reference voltage applied at 58 with a voltage from a potentiometer 57 driven by the altitude parameter $h$ obtained as described in accordance with FIG. 1. When $h$ is lower than a certain low value (for instance of the order of twenty meters), member 56 will actuate to work the associated contact, and relay 109 as well as relay 107 will be energized from the battery at 54 when relay 117 is at work. The purpose of such an arrangement will be explained further below.

A member 59 is supplied from a potentiometer 60 driven by $h_o$. Thus, when the altitude decreases, member 59 will attract the associated contact and lead D is supplied when relays 102 and one of relays 101 and 107 are energized. The purpose of this provision will also appear further below.

Member 65 serves to compare a reference voltage at 67 and the voltage from potentiometer 66 driven by $h$, and when $h$ becomes or is lower than a certain value (of the order of three hundred meters for instance), member 65 operates and through the contact associated therewith applies battery voltage through lead E to relay 102 (FIG. 6) when relays 118 and 116 are at work; the purpose of this third arrangement will also be explained below.

In the monitoring equipment there exist three relays placed under the control of operation conditions of the motors of the aircraft (for instance, it will be considered that the simulated craft is a two-jet engine). These relays are as follows:

Relay 103 is energized when the pilot has placed the two gas handles of his engines into positions of full fuel supply. Relay 103 is then energized by a battery through cam contacts serially connected in the battery lead and actuated by two cams 63 and 64 driven by the shafts of these gas handles.

Relay 117 is only energized when the battery voltage is applied thereto through serially connected contacts controlled by two cams 61 and 62 mounted on the same handle shafts mentioned above. These contacts close for an alarm condition signalling to the pilot that he must control the landing wheel train. For certain types of aircraft, special microswitches are provided on the power controls for automatically giving such an alarm. In the simulation of such aircraft, of course, the actuation of relay 117 will be placed under the control of such microswitches.

Relay 118 is energized from the battery through a pair of cam contacts serially connected, and the corresponding cams 69 and 68 may be considered as controlled by shafts representing, in the simulator by their position the speed of rotation of the different motors. The cam contacts are closed when either one or the other speed of engine rotation is lower than a certain critical value, which is a critical value for the slow down of the engines.

Now, in order to avoid a tedious listing of all parts of the monitoring equipment, these parts will be described in the explanation of the operation of the equipment.

Initial or rest conditions

The servo-mechanism of FIG. 7 is at rest, its shaft being at zero angular position. Cam 76 maintains relay 114 energized through the cam contact connected to battery. Battery voltage is applied to lead 25 through a rest contact of relay 110 which is unenergized since switch contact 85 is open (this contact will only be energized for a G.C.A. landing). Battery voltage is also applied to lead 23. The computers for the speed and speed components are controlled to start on their ground departure program, FIGS. 1 to 5.

Since the altitude is zero, the comparator 56 has attracted its contact; consequently, as long as cams 61 and 62 remain in their respective conditions, relays 109 and 107 remain energized by the battery voltage through a work contact of relay 117.

Since the contacts of cams 63 and 64 are open, relay 103 is not energized. Relay 111 is energized by the battery voltage passing through the work contact of relay 114 and the corresponding work contact of relay 115. Relay 108 is energized by the battery voltage simulating at this point the application of the brakes to the landing wheel train, switch 84 being closed through the work contact of relay 113 which is energized from the battery through the contact of cam 78 (the simulated aircraft is one the ground). Lead C is disconnected from the input 71 of the servo-mechanism.

Relay 101 is at rest because its activation circuit is disconnected at the rest contact of relay 110. Relay 102 is at rest, its activation circuit being disconnected at a rest contact of relay 116 which is de-energized since relay 115 is energized. Since the speed is zero, and consequently, lower than that for which cams 68 and 69 break their contacts, the contact of comparator 65 is attracted and relay 118 energized. Lead D is insulated from any supply at the contact of relay 102. Relay 105 is energized by the battery through switch 85 and the work contact of relay 104 which is energized by the battery through the contact of cam 80.

Leaving the ground

In the simulated flight, the pilot has started the engines of the craft and consequently relay 117 has been de-energized. The same applies to relays 109 and 107. When the simulated speed of the engines increases to a value higher than the above mentioned critical value, relay 118 is de-energized. For leaving the ground, the pilot has exercised maximum power control actuating the gas handles up to their full effectiveness, so that relay 103 has been energized and a supply voltage of a definite phase has been applied at 55 and carried through the work contact of relay 103 to the lead C and through the work contact of relay 111 up to the rest contact of 108.

When the pilot unlocks the brakes, switch 84 opens and the battery is disconnected from relay 108 which is de-energized and consequently, the voltage of lead C is brought to the input 71 of the servo-mechanism 72—73 which begins to operate. Shaft 27 rotates and cam 76 disconnects the battery from relay 114 which is de-energized. Relay 111 remains energized by the battery through the work contact of relay 115 which remains energized. Leads 23 and 25 still receive the battery voltage. The four speed data computers operate on ground departure program as required. When cam 78 opens its contact, relay 113 is de-energized and the pilot knows that fictitiously the craft has left ground. The programs are running automatically and, at their termination, shaft 27 reaches the end of its course so that cam 79 de-energizes relay 115. Relay 116 is energized but this relay is of a delayed action type to simulate an increase in altitude to a value higher than that at which comparator 65 opens the circuit of lead E. Thus relay 102 cannot be operated even in case the pilot actuates the power controls of the engines in such a way as to close the work contact of relay 118 before in this starting period of fictitious flight such altitude value has been reached. Once relay 116 is energized, it is maintained from battery through the rest contact of 115 as well as through the rest contact of 114. Relay 115 when de-energized cuts off the battery from lead B and the computers are set to their "normal flight" computation operations.

From this instant the monitoring equipment does not interfere with the simulated flight until the aircraft has to "land." For landing, as stated above, two cases, with and without G.C.A. control, will be considered.

Landing without G.C.A. control

Relay 116 being energized, the pilot will reduce the speed of the aircraft until at the above mentioned critical value the contacts of cams 68 and 69 will close and battery will be applied to the work contact of 118. As the speed decreases, the comparator of this decrease, 59, closes its contact and lead D is connected to the armature of the change-over contact of relay 102. When the altitude $h$, computed as stated above, decreases below the value to which comparator 65 is adjusted, relay 102 is energized and lead D receives a supply voltage from 53 through the rest contact of 101 (not energized since 110 is not energized). This supply voltage is applied to point 71 and the servo-mechanism is again set to rotate. The phase, however, of this supply voltage is such that the rotation of shaft 27 is reversed with respect to the direction of rotation at the ground departure operation. Cam 79 leaving its end position in the course of rotation of shaft 27, re-establishes the energizing circuit for relay 115 and consequently battery voltage is applied to lead 25 and the computers for speed data of FIGS 1 to 5 operate on ground approach programs. Relay 111 cannot be energized as relay 114 is at rest, and the battery voltage cannot reach the lead 23. Consequently, the computers are effectively set on ground landing or approach programs. As stated above, relay 116 is maintained energized by the battery at the rest contact of 114.

The overall program concerned will develop normally. When the altitude reaches a value below that set on comparator 56, relays 109 and 107 will be energized but without any effective result in the equipment. At the instant of reaching ground, simulated by the position of cam 80 reaching a position of applying battery to relay 104 (which has been de-energized since ground departure), a new voltage path extends through lead D to the servo-mechanism. When the pilot applies the brakes, by closing switch 84, this voltage path extends through the work contact of relay 105 which is energized under this condition, and the braking operation is simulated by the supply of the servo-mechanism through two simultaneous parallel paths. When the pilot actuates the tail parachute control (which is dispensable) by closing switch 82 in the simulator, relay 106 is energized and lead D is connected to a third input terminal of the servo-mechanism for simulating such an effect.

When shaft 27 returns to its zero angular position, cam 76 re-energizes relay 114 disconnecting relay 116, de-energizing relay 102 and disconnects the lead D from the supply at 53.

All computer and monitoring circuits have returned to rest.

Landing with G.C.A.

In this case, relay 110 of the monitoring equipment has been energized and, consequently, during the normal landing operation, cam 77 applies battery voltage to lead A and relay 101 is energized so that lead D as well as lead 25 are disconnected. The computers do not operate on program conditions. The servo-mechanism of the monitoring equipment is not actuated until the pilot places the power controls in suitable condition for the energization of relay 117; then comparator 56, detecting a low altitude at which ground action must be simulated, attracts its contact, and consequently, relays 109 and 107 are energized. Relay 109 applies battery voltage through lead 25 to the computers and relay 107 connects the supply voltage of lead D. The landing conditions are then met for the end of the landing programs through a normal operation of monitoring equipment and computers.

I claim:

1. In a flight simulator, analog voltage computers having outputs simulating the speed and axial components thereof during periods of simulated flight other than predetermined ground departure and ground approach periods, transducing means for translating said simulating outputs into speed indications, experimental program record units having outputs simulating predetermined speeds and axial speed components thereof for said ground departure and approach periods, switching means for selectively switching said speed translating means from the outputs of said analog voltage computers to the outputs of said program units, and monitoring means under the control of simulated altitude conditions controlling said switching means to cause said program units to be operative at an altitude range extending from a predetermined altitude to ground.

2. A combination according to claim 1, wherein each of the speed component computers comprises an analog computer, and at least one program unit and an output member actuated from the output of said analog computer, said switching means being inserted between the outputs of said analog computer and program unit and the input of said member, and wherein the output member of the analog computer for the speed component along the vertical coordinate axis, is provided with a direct output and an integrated output, said monitoring equipment including members fed by said direct and integrated outputs, respectively, and responsive to altitude conditions in the simulated flight.

3. A combination according to claim 1, comprising means for deriving an altitude representative voltage from at least one of said components and wherein said monitoring means include means for comparing said altitude voltage with a reference voltage representing an upper limit of said altitude and relay means controlled by said comparing means and controlling at least some of said program units so that said units will become substantially operative when said altitude voltage, while gradually increasing, becomes substantially equal to said reference voltage.

4. A combination according to claim 1, comprising means for deriving a vertical speed representative voltage and integrating means for deriving from said vertical speed voltage an altitude representative voltage, and wherein said monitoring means include means for comparing said altitude voltage with a reference voltage representing an upper limit of said altitude range, and relay means controlled by said comparing and integrating means, and controlling at least some of said program units so that said units will become substantially operative when said altitude voltage, while gradually decreasing, becomes substantially equal to said reference voltage.

5. A combination according to claim 1, for ground controlled approach wherein said monitoring means include additional relay means for causing said program units to be inoperative, integrating means, additional comparing means for comparing the altitude voltage with another reference voltage representing a lower limit of said altitude range, and further relay means controlled by said additional comparing means and said integrating means, and controlling at least some of said program units so that said units will become substantially operative when said altitude voltage, while gradually decreasing, becomes substantially equal to said other reference voltage.

6. A combination according to claim 1, wherein said monitoring equipment comprises a servo-mechanism driving a shaft, program controlling cams on said shaft, means for simulating altitude changes, and routing means under the control of said altitude simulating means for feeding to the input of said servo-mechanism supply voltages for rotating said shaft in one direction for a ground departure operation and in opposite direction for a ground approach operation, all this under the control of initiating conditions set from the pilot controls of the aircraft.

7. A combination according to claim 6, comprising means responsive to altitude changes controlling said routing relays, said means including means for predeterminedly setting the different altitudes at which ground departure and approach programs become operative to permit initiating conditions to be automatically set from the pilot controls of the aircraft.

8. A combination according to claim 6, comprising manual controls for engines, brakes, and flight altitude in said servo-mechanism, a plurality of inputs selectively and simultaneously activatable by said manual controls.

9. A combination according to claim 6, comprising altitude comparing means controlling said routing means.

10. In a flight simulator, analog voltage computers having outputs simulating the speed and the speed components according to three axes of coordinates, during periods of simulated flight other than predetermined ground departure and ground approach periods, transducing means for translating said simulating outputs into speed indications, experimental program record units having outputs simulating the speed and the speed components for an altitude substantially below a predetermined altitude, means for deriving an altitude representative voltage from at least one of said components, means for comparing said altitude voltage with a reference voltage representing said predetermined altitude, and relay means controlled by said comparing means and controlling at least some of said transducing means to be disconnected from the outputs of at least some of said program units and to be connected to the outputs of at least some of said analog components, when said altitude voltage, while gradually increasing, becomes substantially equal to said reference voltage.

11. In a flight simulator, analog voltage computers having outputs simulating the speed and the speed components according to three axes of coordinates, during periods of simulated flight other than predetermined ground departure and ground approach periods, transducing means for translating said simulating outputs into speed indications, experimental program record units simulating speed and speed components for an altitude substantially below a predetermined altitude, means for deriving a vertical speed representative voltage and integrating means for deriving from said vertical speed representative voltage an altitude representative voltage, means for comparing said altitude voltage with a reference voltage representing said predetermined altitude and relay means controlled by said comparing and integrating means and controlling at least some of said transducing means to be disconnected from the outputs of at least some of said analog computers and to be connected to the outputs of at least some of said program units when said altitude voltage, while gradually decreasing, becomes substantially equal to said reference voltage.

12. A flight simulator according to claim 11 cooperating with ground controlled approach means, comprising additional relay means for causing said program units to be inoperative, additional comparing means for comparing the altitude voltage with another reference voltage representing a lower limit of said altitude range, and further relay means controlled by said additional comparing means and said integrating means, and controlling at least some of said program units to become substantially operative when, said altitude voltage, while gradually decreasing, becomes substantially equal to said other reference voltage.

13. In a flight simulator, an analog flight speed computer having an output simulating vertical speed, transducing means for indicating said speed and means for deriving therefrom a simulated altitude analog, a pair of program units operative at opposite ends of a predetermined simulated altitude range and having outputs simulating speeds for ground departure and ground approach, respectively; first and second switching means, whereby said first switching means selects one of said program units for routing its output to said second switching means, and said second switching means at least under the control of simulated altitude, replaces the output of said analog computer with that of the selected program unit at said transducing means so as to cause said program unit to become operative.

14. A flight simulator according to claim 13 comprising means, for deriving from said transducing means a vertical speed analog and from said speed analog an altitude analog; whereby said first switching means selects a ground departure program unit, and said second switching means under the control of zero altitude, replaces the output of said analog computer with that of said ground departure program unit; and under the control of altitude at the top end of said predetermined altitude range replacing the output of said ground departure program unit with that of said analog computer.

15. A flight simulator according to claim 13 comprising means for deriving from said transducing means a vertical speed analog and from said vertical speed analog an altitude analog; whereby said first switching means selects a ground approach program unit; and said second switching means under the control of altitude at the top end of said predetermined altitude range and under the control of decreasing vertical speed, replaces the output of said analog computer with that of said ground approach unit.

16. A flight simulator cooperating with ground controlled approach means according to claim 13, comprising means for deriving from said transducing means a vertical speed analog and from said vertical speed analog an altitude analog; whereby said first switching means selects a ground approach program unit, and said second switching means under the control of altitude near the bottom end of said predetermined altitude range and under the control of decreasing vertical speed, replaces the output of said ground controlled approach relay with that of said ground approach program unit.

References Cited in the file of this patent

UNITED STATES PATENTS

| | | |
|---|---|---|
| 2,397,477 | Kellogg | Apr. 2, 1946 |
| 2,485,499 | Lewis | Oct. 18, 1949 |
| 2,553,529 | Dehmel | May 15, 1951 |
| 2,554,155 | Rippere | May 22, 1951 |
| 2,584,261 | Davis | Feb. 5, 1952 |
| 2,731,737 | Stern | Jan. 24, 1956 |